No. 741,204. PATENTED OCT. 13, 1903.
S. WILLIAMSON.
COIN CONTROLLED WEIGHING MACHINE.
APPLICATION FILED MAY 6, 1902.
NO MODEL. 5 SHEETS—SHEET 1.
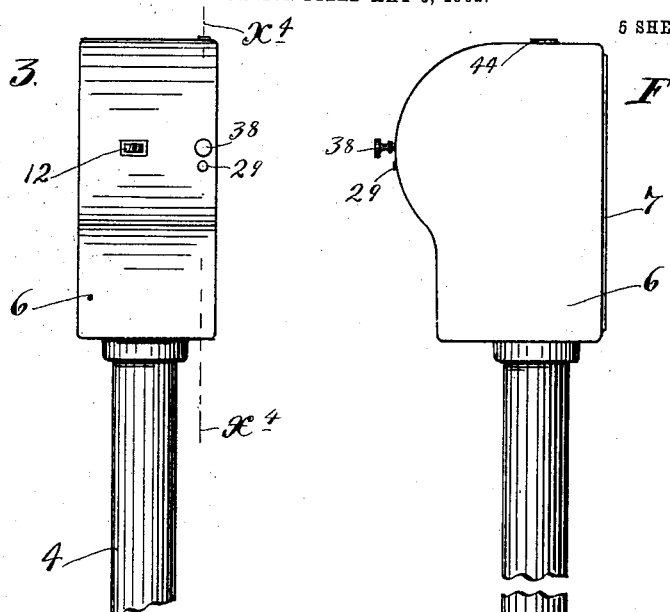
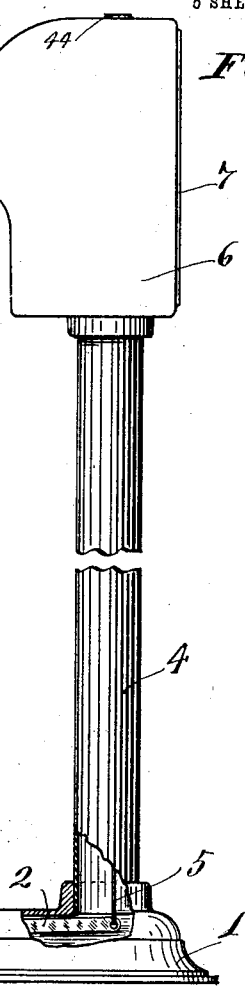
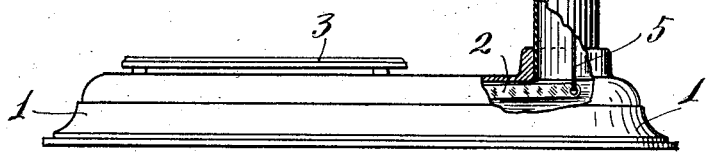
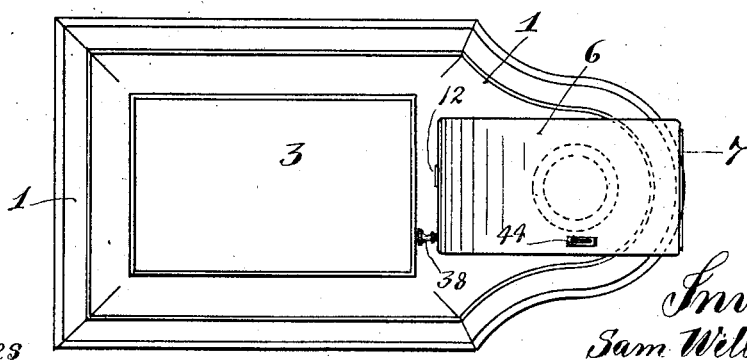

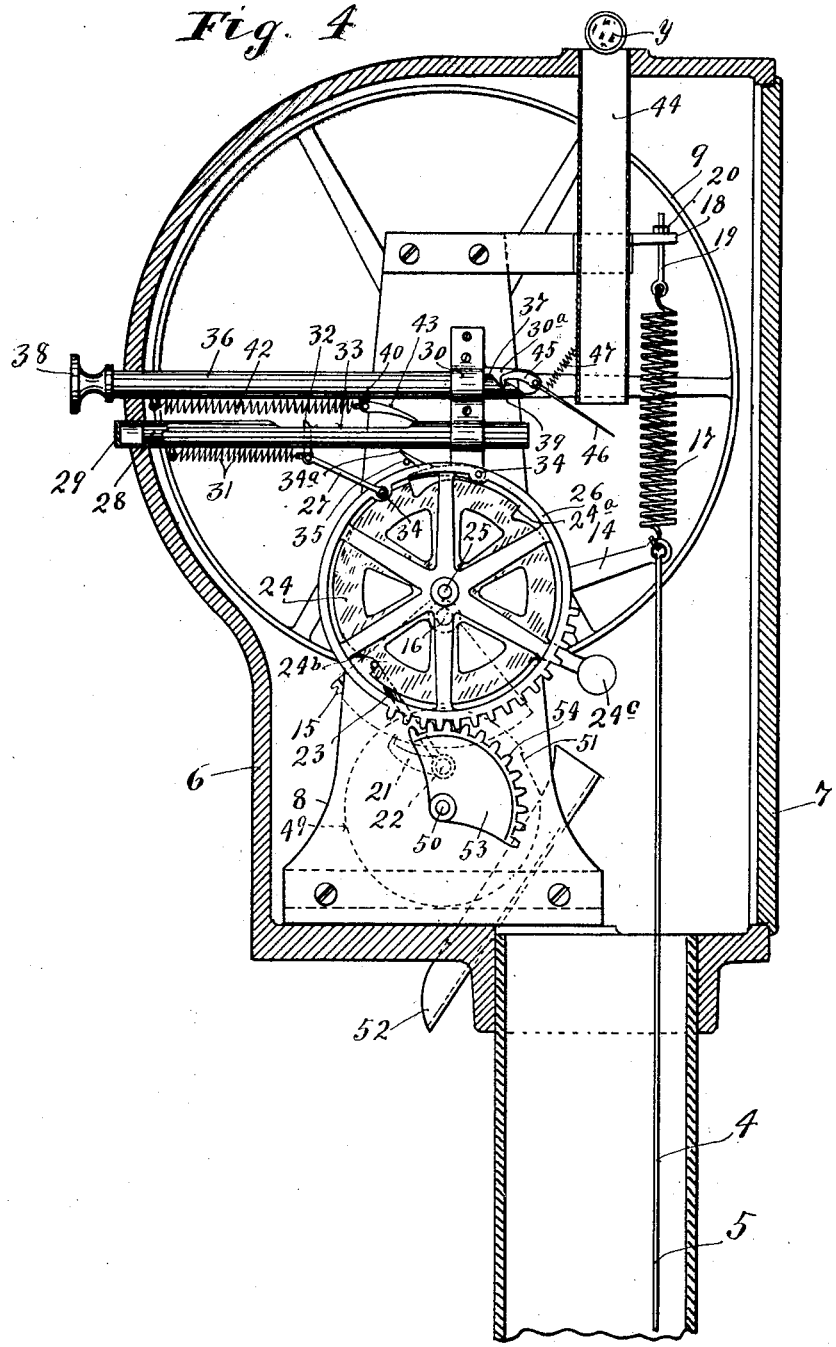

No. 741,204. PATENTED OCT. 13, 1903.
S. WILLIAMSON.
COIN CONTROLLED WEIGHING MACHINE.
APPLICATION FILED MAY 6, 1902.
NO MODEL. 5 SHEETS—SHEET 3.

Witnesses.
A. H. Opsahl.
H. D. Kilgore

Inventor
Sam Williamson
By his Attorneys
Williamson & Merchant

No. 741,204. PATENTED OCT. 13, 1903.
S. WILLIAMSON.
COIN CONTROLLED WEIGHING MACHINE.
APPLICATION FILED MAY 6, 1902.
NO MODEL. 5 SHEETS—SHEET 4.

Witnesses,
A. H. Opsahl.
H. D. Kilgore

Inventor
Sam Williamson
By his Attorneys.
Williamson & Merchant

No. 741,204. PATENTED OCT. 13, 1903.
S. WILLIAMSON.
COIN CONTROLLED WEIGHING MACHINE.
APPLICATION FILED MAY 6, 1902.
NO MODEL. 5 SHEETS—SHEET 5.
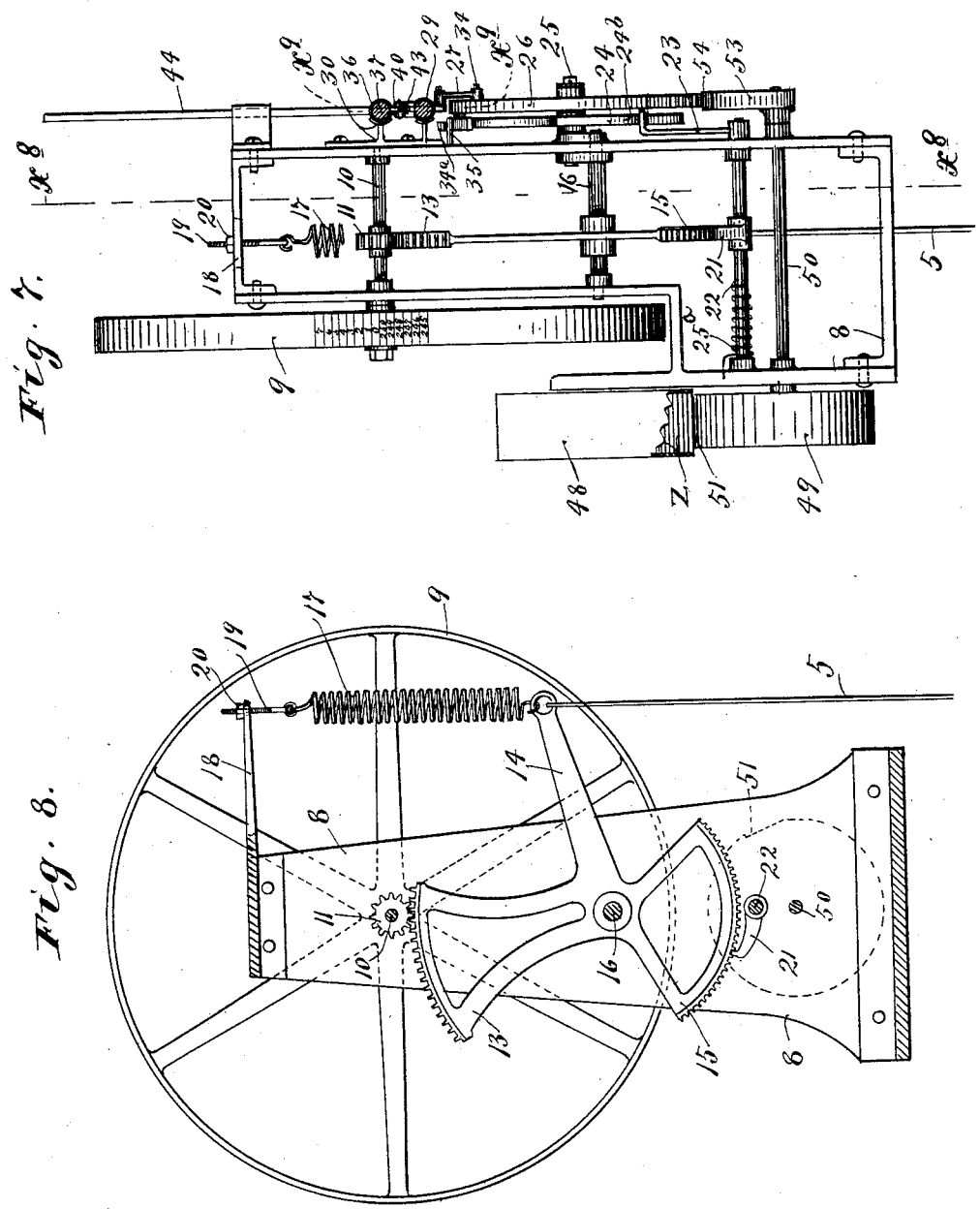

No. 741,204. Patented October 13, 1903.

UNITED STATES PATENT OFFICE.

SAM WILLIAMSON, OF MINNEAPOLIS, MINNESOTA.

COIN-CONTROLLED WEIGHING-MACHINE.

SPECIFICATION forming part of Letters Patent No. 741,204, dated October 13, 1903.

Application filed May 6, 1902. Serial No. 106,114. (No model.)

*To all whom it may concern:*

Be it known that I, SAM WILLIAMSON, a citizen of the United States, residing at Minneapolis, in the county of Hennepin and State of Minnesota, have invented certain new and useful Improvements in Coin-Controlled Weighing-Machines; and I do hereby declare the following to be a full, clear, and exact description of the invention, such as will enable others skilled in the art to which it appertains to make and use the same.

My invention has for its object to provide a coin-controlled weighing device of improved construction; and to this end it consists of the novel devices and combinations of devices hereinafter described, and defined in the claims.

The invention is illustrated in the accompanying drawings, wherein like characters indicate like parts throughout the several views.

Figure 5:
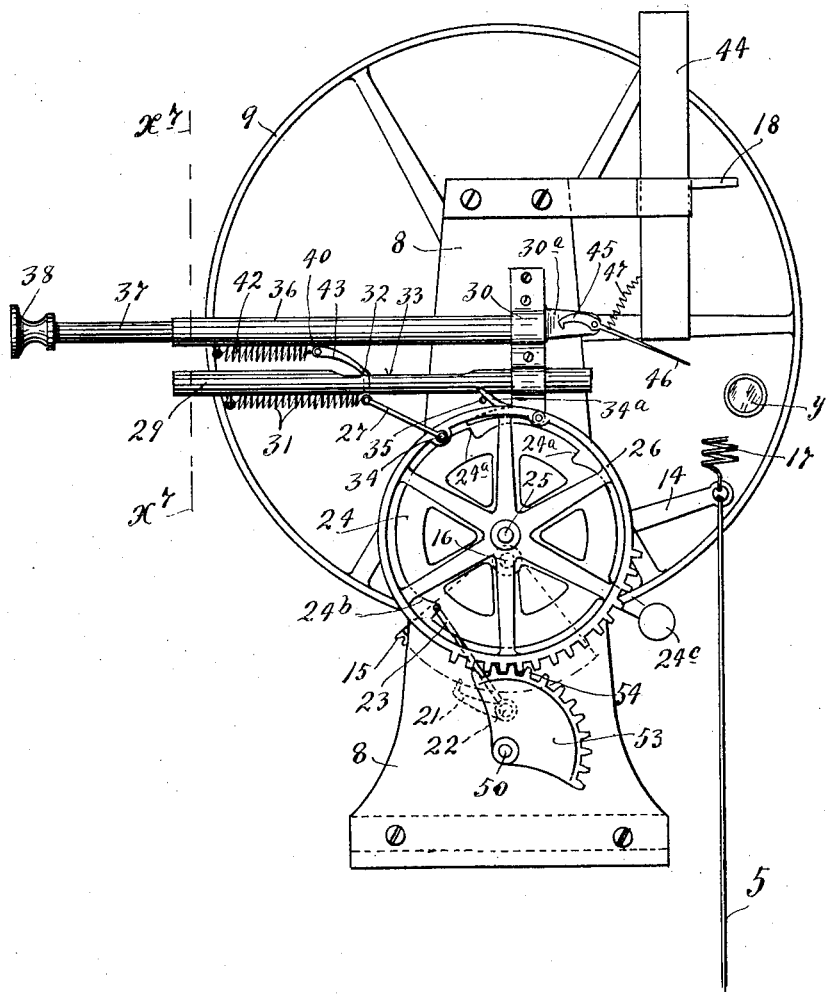
Figure 6:
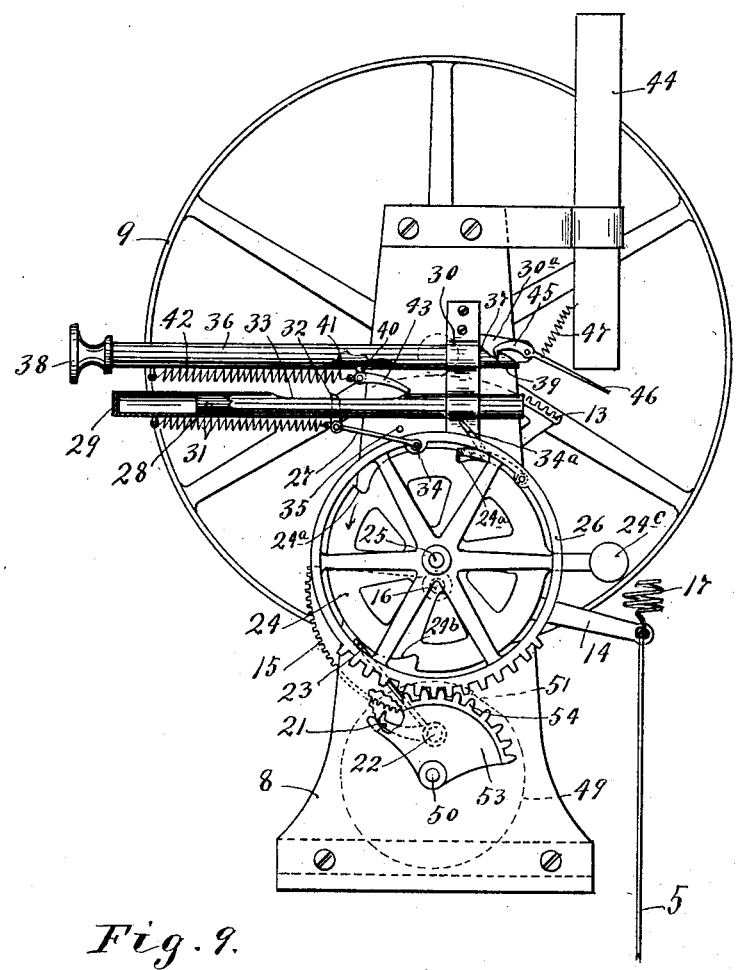
Figure 9:
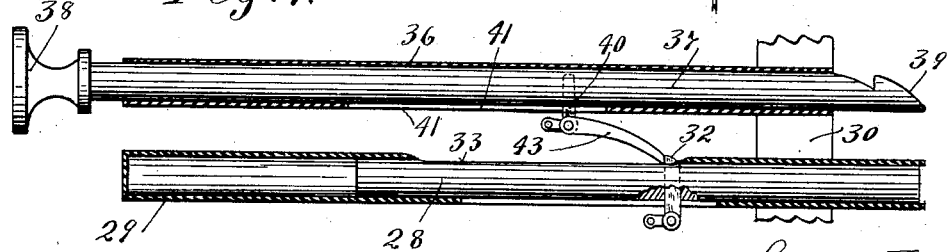

Figure 1 is a view in side elevation, but with some parts broken away, showing a complete device embodying the several features of my invention. Fig. 2 is a plan view of the same. Fig. 3 is a front elevation of the head or upper section of the case. Fig. 4 is a section taken approximately on the line $x^4 x^4$ of Fig. 3, some parts being broken away. Figs. 5 and 6 are views corresponding to Fig. 4, but illustrating different positions of the parts and with the head of the case removed. Fig. 7 is a view principally in front elevation with parts broken away, but partly in section on the line $x^7 x^7$ of Fig. 5. Fig. 8 is a section on the line $x^8 x^8$ of Fig. 7, and Fig. 9 is a detail in vertical section taken approximately on the line $x^9 x^9$ of Fig. 7.

The numeral 1 indicates the base of an ordinary scale, within which is mounted the levers of the scale mechanism, including the rod-actuating lever 2.

The numeral 3 indicates the scale-platform, and the numeral 4 indicates a tubular standard secured to the base 1 and through which extends the vertical scale-rod 5. To the upper end of the tubular standard 4 is secured a hollow head or case section 6, provided with a detachable door or side 7, which is secured in position in any suitable way.

The coin-controlled weight-indicating mechanism is mounted within the head 6, the running parts thereof being supported by a rectangular skeleton framework 8, rigidly secured to the base of said head.

The numeral 9 indicates a large indicator-wheel which is marked on its periphery with the successive numerals from zero up to any desired number—say "250." This indicator-wheel is carried by a short counter-shaft 10, journaled in the frame 8 and provided with a spur-pinion 11. The numerals marked on the indicator-wheel 9 are exposed to view through a sight-opening 12, formed in the front of the head 6, as best shown in Fig. 3. The pinion 11 meshes with a segmental gear 13, which has an arm 14 and a depending toothed segmental section 15. Said segmental gears 13 and 15 and arm 14 are carried by a counter-shaft 16, journaled in the frame 8. The scale-rod 5 is connected to the free end of the arm 14 and draws downward on the same. Said arm 14 is yieldingly held upward by a scale-spring 17, connected to the free end thereof and to the projecting end of a bar 18, secured to the top of the frame 8. The said spring 17 is directly connected to the bar 18 by means of a bolt 19, provided with a nut 20, by means of which the tension of the spring 17 may be adjusted.

A lock-dog 21, carried by a rock-shaft 22, journaled in the frame 8, coöperates with the teeth of the segmental gear or section 15 to lock the same at the proper time against movement in either direction. Secured to one end of the rock-shaft 22 is a trip-arm 23, provided at its free end with a laterally-bent portion which coöperates with a cam-wheel 24, journaled on a stud 25, projecting from one side of the frame 8. The said cam-wheel 24 is provided with peripheral notches, which afford shoulders $24^a$ and cam-surfaces $24^b$. A spring $25^a$, secured at one end to the shaft 22 and at its other end to the frame 8, as shown in Fig. 7, tends to keep the dog 21 in engagement with the teeth of the gear 15, as shown in Fig. 8. The cam-wheel 24 is provided at one side with a weighted arm $24^c$, which tends to hold the same in its normal position. (Indicated in Figs. 4 and 5.) Also loosely mounted on the stud 25 by the side of the cam-wheel 24 is an oscillating driving-wheel 26, which is connected by a short link 27 to a reciprocating plunger 28, mounted in a horizontallyextended tube or sheath 29, supported by a bracket 30 on the frame 8 and also by the case 6. The outer end of the tube 29 is closed and serves as a dash-pot to the outer end of the plunger 28. The plunger 28 is yieldingly drawn outward or toward the left with respect to Figs. 4, 5, and 6 by means of a spring 31. At its intermediate portion the plunger 28 is provided with a single upwardly-projecting tooth 32, and the tube 29 is cut away throughout a portion of its upper section, as indicated at 33, so as to expose the said tooth to the action of a driving-pawl, as will presently appear.

The driving-wheel 26 carries a pivoted dog $34^a$, which operates on the shoulders $24^a$ of the cam-wheel 24 at the proper time, as will presently appear. The said dog $34^a$ is provided with a cam tail or projection, which in the normal position of the parts engages a pin 35 on the frame 8 and holds the said dog in an inoperative position.

Extending parallel with the tube 29, just above the same and supported by the bracket 30 and the case 6, is a guide-tube 36. An operating-plunger 37, provided at its outer end with a finger-piece 38 and at its inner end with a beveled lock-lug 39, reciprocates freely within the tube 36. The plunger 37 has a depending ear or lug 40, which works through a slot 41 in the tube 36. A spring 42, connected to said ear 40 and to the outer end of the tube 36, puts the plunger 37 under strain to move outward. A driving-dog 43, pivoted to the lug 40, coöperates with the tooth 32 of the secondary plunger 28 in a manner which will appear in the description of the operation.

The numeral 44 indicates a coin-delivery spout, which, as shown, leads from the top of the head 6 and terminates slightly to the rear of the inner end of the tube 36.

The numeral 45 indicates a plunger-locking dog or detent which is pivoted to a projection $30^a$ of the keeper 30 and is provided with a blade 46, which underlies the delivery end of the spout 44. The detent 45 normally engages with the shoulder of the lock-lug 29 and holds the primary plunger 37 in the normal position (indicated in Fig. 4) against the tension of the spring 42. A light coiled spring 47 yieldingly holds the blade 46 and dog 45 in their normal positions.

I propose to deliver to each person depositing a coin for the purpose of having his weight indicated a card or ticket having printed thereon a short sentence or statement which, for the purposes of amusement may be called a "fortune-card." These cards $z$ are placed in a stack within a suitable magazine 48, secured to the frame 8, as best shown in Fig. 7. A wheel 49, carried by a counter-shaft 50, mounted in the frame 8, affords a movable bottom for the magazine 48 and serves to support the stack of cards $z$. This wheel 48 is provided with a single peripheral notch 51 of sufficient depth to receive but one of the cards $z$ at one time. Each time the wheel 49 is moved from its normal position, wherein its notch 51 stands in line with the magazine, into the position indicated in Fig. 4 it carries one of the cards $z$ from the magazine and deposits the same in a delivery-chute 52, which extends through an opening in the bottom of the head or case section 6.

The required oscillatory movement is imparted to the shaft 50 and wheel 49 through a segmental gear 53, which engages teeth 54 on the driving-wheel 26.

The character $y$ indicates a coin which is to be dropped through the coin-delivery chute 44 to set the machine into action.

The operation of the device as an entirety is substantially as follows: Normally the indicator-wheel 9 is, as already stated, locked by the engagement of the dog 21 with the segmental gear 15. Hence when the person desiring to have his weight indicated first steps onto the scale-platform 3 no indication whatever of his weight will be given. He next drops the coin $y$ into the spout 44, and this coin dropping onto the blade 46 releases the primary lock-dog 45 from the lug 39 of the primary plunger 37, and the said plunger 37, being thus released, is thrown outward into the position indicated in Fig. 5 by the spring 42. In this position it will be noted the driving-dog 43 engages outward of the tooth 33 of the secondary plunger 28. The operator then forces the plunger 37 back into its normal position, where it will be again locked by the dog or detent 45. Under this inward movement of the plunger 37 the dog 43 acts upon the tooth 32 and forces the secondary plunger 28 inward to its extreme position, thereby moving the driving-wheel 26 far enough to carry the dog $34^a$ into engagement with the shoulder $24^a$ of the cam-wheel 24, which stands next rearward or toward the right with respect to Fig. 4. At the extreme limit of the movements of the two plungers 37 and 28 the driving-dog 43 is cammed out of engagement with the tooth 32 by its engagement with a beveled portion of the tube 29 at the inner extremity of the slot 33, and the said plunger is then moved slowly outward under the action of the spring 31, this movement of the plunger being retarded by the air confined in the outer end of the tube 29 and which must escape between the said plunger and tube. When the plunger 28 moves outward, it imparts a working movement to the driving-wheel 26, and the dog $34^a$, acting upon the cam-wheel 24, moves the latter in the same direction the distance between the two upper notches therein, at the limit of which movement said dog 34 is again released from the wheel 24 by the pin 35, acting on the projection $34^a$ thereof. The initial movement of the wheel 24 under the action of the pawl 34 carries the lower cam-surface $24^b$ against the free end of the arm 23, and thereby throws the locking-dog 21 out of engagement with the teeth of the segmental gear 15, and thus releases the indicator-wheel 9, arm 14, and spring 17. As is evident, when the wheel 24 reaches the limit of its movement under the action of the pawl 34ª and the said pawl is released therefrom it is moved back to its normal position under the action of the weighted arm 24ᶜ, and upon reaching normal position the free end of the arm 23 again drops into the lower notch of said wheel 24, and the dog 21 again engages the teeth of the segmental gear 15 and locks the same and the indicator-wheel 9 in the position indicating the weight of the person standing on the platform. The said indicator-wheel will, as is evident, be locked in this position until another person, standing on the scale-platform, deposits a coin of the proper denomination within the spout 44 and sets the machine again into action. When the machine is thus set into action, the indicator-wheel will move in the one direction or the other to indicate the proper weight of the person on the platform, according to whether the person previously weighed was heavier or lighter than the one being weighed.

It will of course be understood that the purpose of retarding the outward or working movement of the secondary plunger 28 is to give ample time for the proper movement of the indicator-wheel 9 to the position indicating the proper weight while the lock-dog 21 is released from the segmental gear 15. As is further obvious, one of the cards z will be ejected by the wheel 49 while the driving-wheel 26 is being given its working movement under the slow outward movement of the secondary plunger 28.

With the mechanism above described it is impossible to cheat the machine so as to make a single coin serve to give the indication of two persons' weights. It has been a common practice with weighing-machines as hitherto constructed for two persons to step simultaneously on the scale-platform, to drop a single coin, and thereby obtain the aggregate weight of the two, and then for one person to step from the scale and permit the indicator to fall back and indicate the weight of a single person. Other similar tricks have been played on machines of this character, none of which can, however, be played on a machine designed in accordance with my invention.

It will of course be understood that the device above specifically described is capable of many modifications within the scope of my invention, as herein set forth and claimed.

What I claim, and desire to secure by Letters Patent of the United States, is as follows:

1. In a coin-controlled weighing-scale, the combination with an oscillating indicator and connections for operating the same from the scale-platform, said connections involving a toothed segment or element, of a dog normally engaging the teeth of said segment, to hold the same against movement in either direction, a cam-wheel movable to release said dog and permit the proper indicating movement of said indicator and then permitting said dog to reëngage said segment and again lock said indicator-wheel, a driver movable with a retarded action to operate said cam-wheel, and a coin-tripped primary dog or detent normally locking said driver, substantially as described.

2. In a coin-controlled scale, the combination with a primary driver and a coin-tripped detent for locking and releasing the same, of secondary-driver connections whereby said secondary driver is yieldingly drawn in one direction and positively driven in the other direction by said primary driver, means for releasing said secondary driver at the limit of its positive movement, oscillating indicator scale-levers acting on said indicator, a lock normally holding said indicator against movement, and lock-actuating mechanism subject to said secondary driver and operating first to release said indicator and permit its proper movement, under the action of the scale-levers, and then to again lock the same, substantially as described.

3. In a coin-controlled weighing-scale, the combination with a primary driver and a coin-controlled detent normally locking the same, of a secondary driver subject to a spring, connections whereby said secondary driver is positively moved against its spring by said primary driver and is released therefrom at the limit of such movement, a driving-wheel moved by said secondary driver, a cam-wheel, an element carried by said driving-wheel for moving said cam-wheel in one direction, an indicator, a scale-platform having connections for moving said indicator, and a lock normally acting on said indicator, the said cam-wheel serving to hold said lock inoperative while said indicator is receiving its proper movement, but again releasing said lock when the said indicator has reached its set position, substantially as described.

4. In a coin-controlled weighing-scale, the combination with an indicator-wheel and a scale-platform having connections for moving the same, of a lock normally holding said indicator-wheel, a primary driving-plunger provided with a driving-pawl, and spring-pressed in one direction, a coin-tripped detent normally holding said primary plunger against movement under the action of its spring, a spring-pressed secondary driving-plunger provided with a tooth or shoulder coöperating with said driving-pawl, means for releasing said driving-pawl from said tooth at one limit of said plunger's movements, a driving-wheel connected to said secondary plunger and provided with a driving-dog, a notched cam-wheel subject to said driving-dog, and an arm movable with said indicator-lock and subject to said cam-wheel, said parts operating substantially as described.

5. In a coin-controlled weighing-scale, the combination with the indicator-wheel 9 and pinion 11 movable therewith, of the segmental gears 13 and 15 and arm 14 connected for common oscillations, said gear 13 meshing with said pinion 11, the spring 17 acting on said arm 14, the rod 5 connecting said arm to the scale-levers, the primary driving-plunger 37 subject to the spring 42 and provided with the driving-pawl 43, the coin-tripped detent 45 normally holding said plunger 37 against said spring 42, the secondary plunger 28 provided with the tooth 32, the tubular sheath 29 serving as a guide and a dash-pot for said plunger 28 and cut away at 33, the driving-wheel 26 connected to said plunger 28 by a link 27, the notched cam-wheel 24, the driving-dog 34 carried by said wheel 26 and acting on said wheel 24, a pin or projection 35 operating on said dog 34 to normally hold the same inoperative, means tending to return said wheel 24 to its normal position, the dog 21 normally coöperating with said segmental gear 15 to lock said indicator-wheel, and the arm 23 movable with said dog 21 and subject to said cam-wheel 24, said parts operating substantially as described.

In testimony whereof I affix my signature in presence of two witnesses.

SAM WILLIAMSON.

Witnesses:
ELIZABETH H. KELIHER,
F. D. MERCHANT.